March 20, 1956  J. L. BARNES  2,738,948
HIGH PRESSURE FLUID CONTROL VALVES
Filed Dec. 2, 1952  2 Sheets-Sheet 2

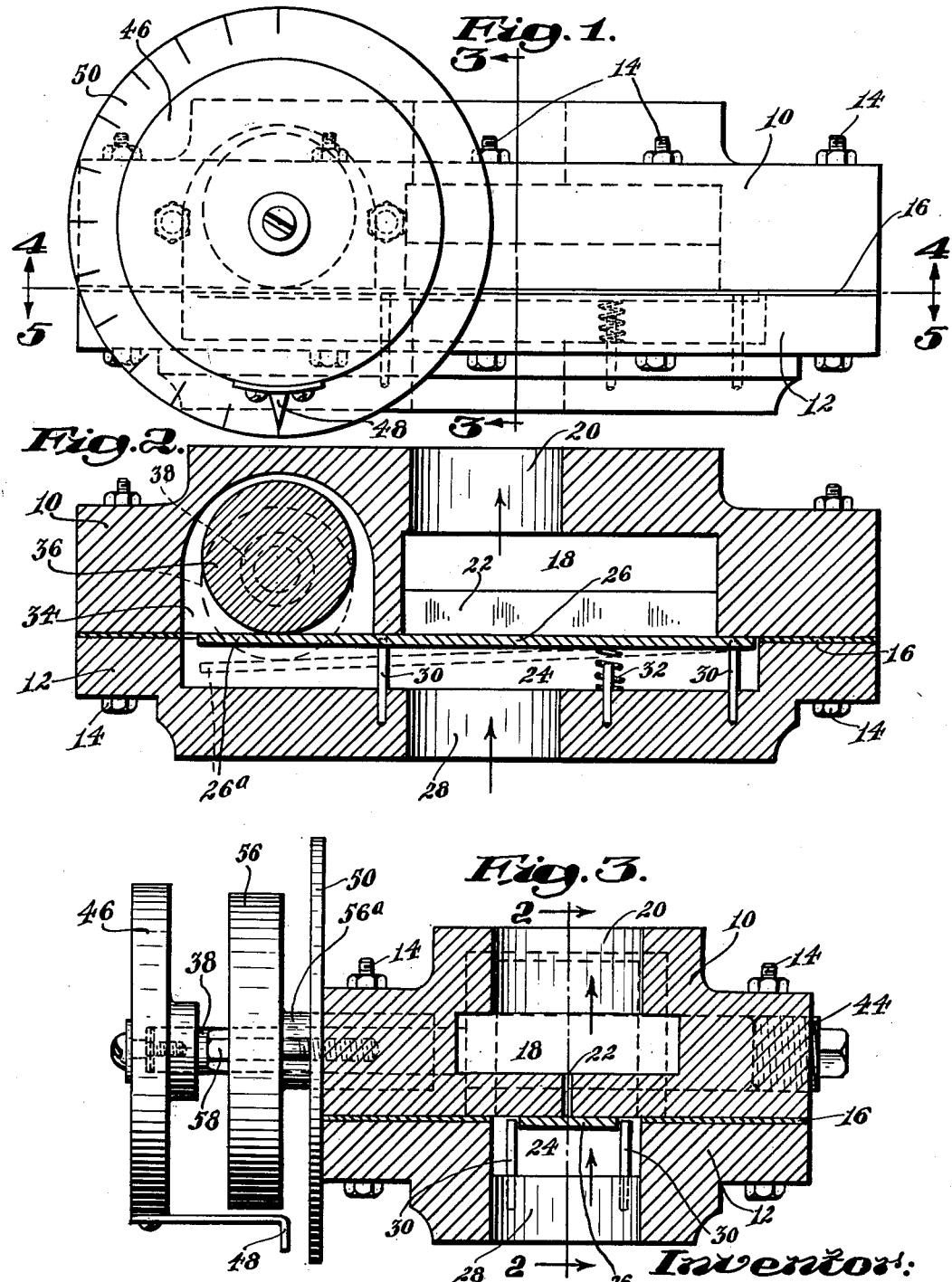

Inventor:
Julius L. Barnes
by John H. McKenna
Attorney

United States Patent Office 2,738,948
Patented Mar. 20, 1956

2,738,948

HIGH PRESSURE FLUID CONTROL VALVES

Julius Lester Barnes, Cambridge, Mass.

Application December 2, 1952, Serial No. 323,673

5 Claims. (Cl. 251—205)

This invention relates to improvements in valves of the general type having provision for micromatic control of relatively high pressure fluids. More particularly, the invention provides such a valve wherein a flat strip valve element is employed for closing a generally V-shaped passage in the valve casing, with pressure of the controlled fluid acting to hold the valve closed, and with means for "peeling" the strip element from its seat to progressively open more and more of the V-shaped passage for flow therethrough, the progressive uncovering of the V-shaped passage proceeding from the apex thereof.

It is among the objects of the invention to provide a relatively simple and inexpensive valve for micromatic control of relatively high pressure fluids wherein a flow passage is closed by a valve element which is adapted to be "peeled" from its seat to gradually open a progressively increasing area of the passage for flow of fluid. A flat strip-form valve element seats flatwise in closing relation to a flow passage and constitutes a lever which is pried from its seat by means acting at one end of the lever to gradually uncover more and more of the flow passage when the valve is being opened.

Another object of the invention is to provide a valve for flow control of high pressure fluids in response to tilting movements of a relatively rigid flat strip valve element which seats flatwise in covering relation to an elongate flow passage and which pivots about one end of of the strip element when the strip element is tilted, thereby to uncover progressively increasing areas of the elongate flow passage as tilting of the strip element proceeds. The strip-form valve element preferably is loosely retained in operative relation to the elongate flow passage, and the pressure fluid which is being controlled constantly acts on the strip element in direction to seat it, whereby the said tilting of the strip element is a leverage action in opposition to the fluid pressure which is tending to hold the strip element seated.

A further object of the invention is to provide a valve for micromatic control of high pressure fluids wherein the movable valve element continues to operate effectively to close the valve without leakage regardless of wear which may be incidental to repeated operations of the valve over a long period of use.

Yet another object of the invention is to provide a high pressure fluid control valve which is easily manually operable notwithstanding the high interior pressures.

It is, moreover, a purpose and object of the invention generally to improve the structure and operative efficiency of fluid-control valves, and especially such valves designed to control the flow of relatively high pressure fluids.

In the accompanying drawings:

Figure 1 is a side elevation of a valve unit embodying features of the invention;

Figure 2 is a medial cross-sectional view of the unit of Figure 1, the section being on line 2—2 of Figure 3;

Figure 3 is a cross-sectional view on line 3—3 of Figure 1;

Figure 4:
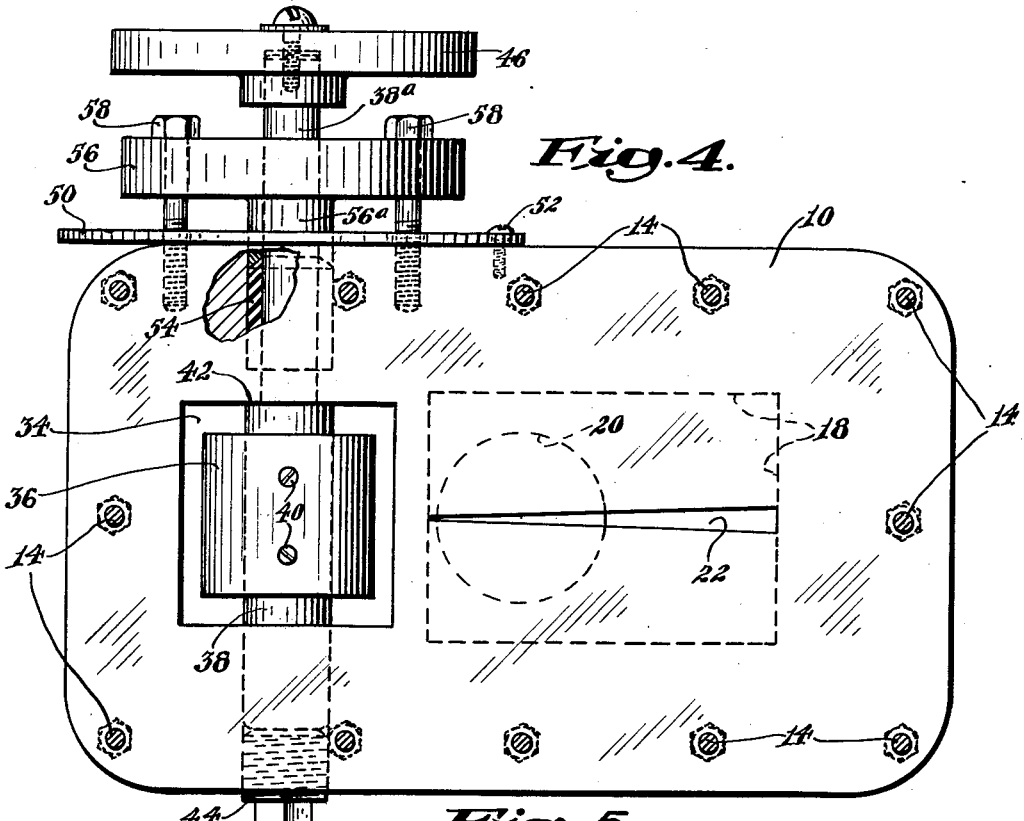
Figure 4 is a cross-sectional view on line 4—4 of Figure 1, looking at the under side of the upper section of the valve housing.
Figure 5:
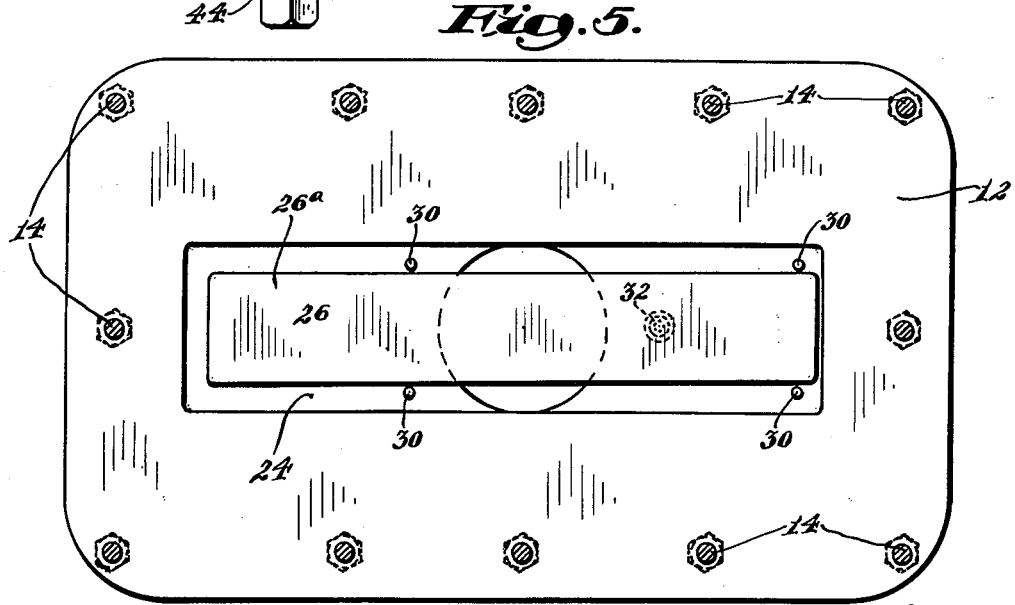
Figure 5 is a similar view on line 5—5 of Figure 1, looking at the upper side of the lower section of the valve housing.

Referring to the drawings, the particular valve unit illustrated has a generally rectangular housing comprising an upper section 10 and a lower section 12 secured together by the bolts 14, with a gasket 16 intervening between the sections all around the margins thereof.

The upper housing section 10 has a rectangular chamber 18 therein, and a hole 20 leads from chamber 18 through the outer wall of the section for delivering fluid passing through the valve unit to any suitable conduit or receptacle which may be connected to the valve unit. The inner wall of chamber 18 has a relatively long and narrow V-shaped passage or slot 22 therein through which fluid can pass into chamber 18 when the valve is opened.

Lower housing section 12 has a rectangular chamber 24 therein substantially longer and narrower than chamber 18 in housing section 10, and a relatively long flat strip valve element 26 is loosely mounted in chamber 24 in position to seat flatwise against the adjacent surface of the inner wall of chamber 18, in closing relation to the V-shaped passage or slot 22. The outer wall of chamber 24 has a hole 28 therein for passage of pressure fluid into chamber 24 from any suitable source. Preferably, a suitable number of guide pins 30 maintain valve element 26 loosely in proper alignment within chamber 24, and a relatively light spring 32, or more than one if found desirable, tends to maintain valve element 26 seated even in the absence of pressure fluid in chamber 24. However, fluid under pressure in chamber 24 ordinarily will be acting on valve element 26 tending strongly to maintain it seated.

As best seen in Figures 2 and 3, the upper housing section 10 has a rectangular recess 34 therein additional to and spaced from chamber 18, this recess 34 being open into one end portion of chamber 24 in the lower section 12. One substantial end portion 26a of valve element 26 projects into the space provided by the recess 34 and the adjacent end portion of chamber 24, and a cam 36 within recess 34 is adapted to engage and actuate the portion 26a of the valve element when the cam is rotated. Any suitable means may be provided for rotatably supporting the cam within recess 34. As herein represented, a shaft 38 extends through housing section 10 and across the recess 34, with cam 36 fixed thereon within recess 34, as by the set screws 40. One substantial end portion 38a of shaft 38 has reduced diameter for providing a shoulder at 42 which engages a wall of recess 34 to limit axial movement of the shaft in one direction. Housing section 10 has a hole therein at one side of recess 34 for accommodating the larger diameter portion of shaft 38 and has a hole therein at the opposite side of recess 34 for accommodating the smaller diameter portion 38a of the shaft. Hence, the shaft may be inserted through the larger diameter hole, with its smaller end leading, and through the cam 36, until shoulder 42 is stopped against a wall of recess 34. Any suitable plug 44 then may close the outer end of the larger diameter hole. Shoulder 42 and the wall against which it engages are nicely machined for closing the inner end of the smaller diameter hole around shaft portion 38a as the fluid pressure in recess 34 acts to force the shoulder tightly against the adjacent wall of the recess. The shoulder helps to seal the said hole against leakage of pressure fluid from the recess 34. The smaller diameter portion 38a of the shaft projects substantially beyond the housing section and has means, such as hand wheel 46, fixed on its outer end to facilitate manual rotations of the shaft. The cam 36, of course, will be properly centered within recess 34 and then secured to the shaft by tightening set screws 40. A pointer 48 is shown fixed on hand wheel 46 for coaction with a graduated dial plate or ring 50 secured to housing section 10 as by screw 52. Preferably, a packing gland 54 is arranged in an enlarged outer portion of the hole through which portion 38a of the shaft extends, and a plate member 56 has an axially projecting part 56a extending into the enlarged portion of the hole in which gland 54 is located. Screws 58 extend loosely through plate member 56 and are screwed into housing section 10 for forcing part 56a into compressing engagement with gland 54. The screws 58 may extend loosely through dial plate or ring 50 and thus coact with screw 52 in maintaining the dial plate or ring 50 in proper position on the housing section 10. Inasmuch as shoulder 42 relatively tightly closes the inner end of the smaller diameter hole against large leakage of pressure fluid around shaft portion 38a, the packing gland 54 does not need to engage around shaft portion 38a as tightly as otherwise would be required, and the gland permits relatively easy rotation of the cam shaft. Also, the action of shoulder 42 permits replacement of the packing gland 54 while the valve continues in service.

Assuming that the low side of cam 36 is toward portion 26a of the valve element, and that a suitable source of fluid under pressure is connected to housing section 12 for delivering pressure fluid through hole 28 into chamber 24, the pressure of the fluid in chamber 24 will hold valve element 26 strongly to its seat. Manual rotation of hand wheel 46, clockwise in Figure 1, will cause the portion 26a of valve element 26, as viewed in Figure 2, to be forced downward with the valve element pivoting about the remote or right hand end thereof in Figure 2. This initial opening action of valve element 26 is a gradual spreading of the strip away from its seat at the apex of the V-shaped passage or slot 22. In effect, the strip is "peeled" from its seat to gradually uncover more and more of the V-shaped passage or slot and progressively wider portions thereof. The pressure fluid must pass around valve element 26 in getting into and through the V-shaped passage or slot 22, and the fluid pressure constantly tends strongly to maintain the valve element closed. Nevertheless, even under relatively high fluid pressure conditions, the valve element 26 may be relatively easily "peeled" from its seat by manual rotation of hand wheel 46, and an extremely accurate and sensitive micromatic control of fluid flow through the valve unit is attained, the fluid delivering from the unit through hole 20 into any suitable conduit or receptacle which may be secured or arranged to receive the delivering fluid.

My improved valve unit eliminates various troublesome problems encountered with rotary and sliding varieties of valves for controlling high pressure fluids. The action of high pressures on prior rotary and sliding types of valves causes wear of particular portions or parts of the prior structures with resulting leakage past the valves unless the worn parts are replaced rather frequently. Also, the action of high fluid pressures on the prior valve elements has made it difficult to manually operate the valves. The herein disclosed flat strip valve element which is "peeled" from its seat to open the valve, presents no problem of wear and ultimate leakage because the fluid pressure constantly acts in direction to close the valve and the opening action is in opposition to the fluid pressure but applied through effective leverage which makes manual actuation and control relatively simple and easy. It should be understood, however, that the herein disclosed means for actuating the strip valve element represents but one of a variety of actuating means and devices which may be employed without departing from the spirit and scope of my invention, and it is intended that the patent shall cover, by suitable expression in the appended claims, whatever features of patentable novelty exist in the invention disclosed.

I claim as my invention:

1. A valve unit comprising a housing having walls defining an interior chamber, one wall of said chamber having an elongate generally V-shaped flow passage therein, a substantially rigid strip-form valve element substantially longer than the V-shaped passage opening and disposed lengthwise of said V-shaped opening, said valve element being movably mounted within said chamber and adapted to seat against said one wall of the chamber in covering and closing relation to said flow passage, said strip-form element having one end portion projecting beyond the apex end of said generally V-shaped flow passage, there being an opening in a wall of said chamber for inflow of fluid under pressure to said chamber and the pressure of said fluid within the chamber being applied to said strip-form element in direction tending to maintain it seated, and means within said housing operative on said projecting end portion of said strip-form element for spreading the strip-form element away from its seat progressively along the V-shaped flow passage from said apex end thereof thereby to gradually uncover progressively wider portions of the flow passage for increment control of flow through the passage.

2. A valve unit comprising a housing having walls defining an interior chamber, one wall of said chamber having an opening therein for inflow of fluid under pressure to said chamber and another wall of said chamber having an elongate generally V-shaped flow passage therein for outflow from said chamber, a generally flat substantially rigid strip-form valve element disposed longitudinally along said flow passage and substantially longer than the V-shaped passage opening, said valve element being movably mounted within said chamber and adapted to be seated flatwise against said wall having said flow passage therein thereby to cover and close said flow passage, the pressure of said fluid in said chamber tending relatively strongly to hold said strip-form element seated, and means operative within said housing for engaging that end portion of the strip-form element adjacent to the apex of said generally V-shaped flow passage for spreading successive portions of the strip-form element away from their seat progressively along said V-shaped flow passage from said apex thereof, whereby the strip-form element is peeled from its seat to gradually uncover progressively wider portions of said elongate flow passage.

3. A valve unit comprising a housing having walls defining an interior chamber, one wall of said chamber having an opening therein for inflow of fluid to said chamber, and another wall of said chamber having a relatively long and narrow V-shaped passage for outflow of fluid from said chamber, a relatively rigid strip-form valve element controlling said outflow passage and seating in the general direction of flow through the outflow passage whereby pressure of fluid in said chamber tends to maintain said valve element seated against outflow of fluid from the chamber, and means engaging one end portion of the strip-form valve element and operative in opposition to said fluid pressure for spreading said valve element away from its seat progressively along the length of said V-shaped outflow passage, the said spreading of the valve element from its seat being a progressive peeling of the valve element from its seat with the fluid pressure in said chamber and said spreading means combining to produce a slight progressive bending of the strip-form valve element whereby substantial portions of said V-shaped outflow passage may be effectively closed by not-yet-peeled portions of said valve element when the valve element has been peeled to open narrower portions of said V-shaped passage.

4. In a fluid pressure valved unit wherein relatively high fluid pressure tends strongly to hold a valve in closing relation to an outflow passage, the combination therein of means providing an interior chamber having a relatively long and narrow V-slot outflow passage in a wall thereof, a relatively long strip-form valve loosely arranged in said chamber and adapted to be strongly held against said slotted wall in closing relation to said V-slot passage by fluid pressure in said chamber, one end of said valve being adjacent to the apex of said V-slot passage, and mechanism for applying relatively large force to said one end of the valve in opposition to said fluid pressure for peeling said valve from said slotted wall progressively along said V-slot from the apex end thereof, said valve being adapted to flex progressively along its extent with said progressive peeling of the valve whereby the said peeling of the valve effects increment opening of progressively wider portions of the V-slot while not-yet-peeled portions of the valve continue to effectively close still wider portions of said V-slot.

5. A valve unit comprising a housing having walls defining an inflow opening and an interior generally rectangular chamber having length transversely of the direction of inflow through said opening substantially greater than the maximum distance across said opening, the wall of said chamber which is opposite said inflow opening having a V-slot outlet passage therein whose V-extent is substantially greater than said maximum distance across said inflow opening in the directions of said transverse longitudinal extent of said chamber, a relatively long strip-form valve loosely arranged within said chamber with an intermediate portion of the valve opposite said inlet opening whereby pressure of fluid entering said chamber through said inflow opening acts on said valve throughout its area in direction tending to hold the valve in closing relation to all portions of said V-slot outlet passage, and means for engaging an end portion of said valve adjacent to the apex of said V-slot passage for peeling said valve progressively from said slotted wall in opposition to said fluid pressure in said chamber thereby to provide increment progressive opening of successively wider portions of said V-slot with the initial opening at the apex end of said V-slot, said means in conjunction with said fluid pressure being adapted to flex the valve slightly whereby said pressure may hold said valve in closing relation to substantial portions of said V-slot passage when the apex and adjacent portions of the slot are being progressively opened by said means.

References Cited in the file of this patent

UNITED STATES PATENTS

| | | |
|---|---|---|
| 19,203 | Osgood | Jan. 26, 1858 |
| 1,403,517 | Miller | Jan. 17, 1922 |
| 1,439,763 | Schaffer | Dec. 26, 1922 |
| 1,494,176 | Little | May 13, 1924 |
| 1,796,440 | Christensen | Mar. 17, 1931 |
| 1,947,637 | Bolster | Feb. 20, 1934 |
| 2,095,842 | Steenstrup | Oct. 12, 1937 |
| 2,434,734 | Buschman | Jan. 20, 1948 |

FOREIGN PATENTS

| | | |
|---|---|---|
| 536,543 | Great Britain | 1941 |